United States Patent

Ooura et al.

[11] Patent Number: 5,999,170
[45] Date of Patent: Dec. 7, 1999

[54] INPUT PEN

[75] Inventors: Nobuhiro Ooura; Akihisa Itoh, both of Fukushima-ken, Japan

[73] Assignee: Alps Electric Co. Ltd., Tokyo, Japan

[21] Appl. No.: 08/993,691

[22] Filed: Dec. 18, 1997

[30] Foreign Application Priority Data

Dec. 25, 1996 [JP] Japan ................................ 8-345776

[51] Int. Cl.⁶ ................................................ G09G 5/00
[52] U.S. Cl. ........................ 345/179; 345/173; 345/174
[58] Field of Search ................................... 345/173, 174, 345/179; 178/18.01, 18.03, 18.05, 18.06, 19.01, 19.03, 19.04, 19.05, 87

[56] References Cited

U.S. PATENT DOCUMENTS

| | | | |
|---|---|---|---|
| 3,673,593 | 6/1972 | Kaye et al. | 346/74 ES |
| 4,491,688 | 1/1985 | Schaub et al. | 178/18 |
| 4,883,926 | 11/1989 | Baldwin | 178/18 |
| 5,541,375 | 7/1996 | Dam et al. | 200/52 R |
| 5,756,941 | 5/1998 | Snell | 178/18 |

*Primary Examiner*—Richard A. Hjerpe
*Assistant Examiner*—Kimnhung Nguyen
*Attorney, Agent, or Firm*—Brinks Hofer Gilson & Lione

[57] ABSTRACT

An input pen for use in operating an operating surface of a capacitance-detecting coordinate device includes a rod-like body, a conductive section connected to one end of the body, a conductive ball joint mounted at the tip of the conductive section to turn relative to the conductive section, a conductive operating section integrally joined to the conductive ball joint and projecting from the tip of the conductive section, and a slide switch mounted at the inner tip of the conductive section. The slide switch operates to electrically connect or disconnect the conductive section and the conductive ball joint when the body is pressed toward one end thereof with the conductive operating section in contact with the operating surface.

7 Claims, 4 Drawing Sheets

INPUT PEN

BACKGROUND OF THE INVENTION

1. Field of the Invention

The present invention relates to an input pen, and more particularly, to an improved input pen which is manually operated to move on an operation surface of a capacitance-detecting coordinate input device, and provides high operability for any operator.

2. Description of the Related Art

In a conventional type of compact capacitance-detecting coordinate input device (referred to as a "tablet" hereinafter), an operation surface thereof was initially operated with the finger of the operator.

However, since the contact area of the fingertip for touching the operation surface of the tablet cannot be reduced below a fixed area, it is impossible to precisely set a coordinate position on the operation surface, and to input the coordinate position with high accuracy.

In order to eliminate such a disadvantage, the operation surface of tablets has been recently operated with an input pen (stylus pen) instead of the finger. The input pen (stylus pen) is formed, for example, by fitting a metal operating member into one end of a rod-like metal body, and cutting the tip of the metal operating member obliquely with respect to the axial direction thereof so as to form an operating section.

FIG. 4 is an outward view showing a structure of the aforesaid well-known input pen (stylus pen).

As shown in FIG. 4, an input pen (stylus pen) 40 is formed by fitting the base of a hollow cylindrical metal operating member 42, which is provided with an operating section 42S formed by cutting the tip obliquely with respect to the axial direction, into one end of a rod-like hollow metal body 41.

In operating an operation surface of a tablet (not shown) with this input pen (stylus pen) 40, the operator grips the metal body 41 as if to hold a pencil or a writing pen, brings the operating section 42S of the metal operating member 42 into contact with the operation surface of the tablet while keeping at least one finger in contact with the metal operating member 42, and appropriately moves the contacting operating section 42S on the operation surface of the tablet, thereby inputting the coordinate position.

The operating section 42S of the metal operating member 42 in the above known input pen (stylus pen) 40 forms a predetermined angle a with the operation surface of the tablet. However, even if the angle α is convenient for some operators in inputting the coordinate position through the input pen 40, it is not always convenient for others, and therefore, the input pen 40 does not have good operability for all operators.

Furthermore, the above input pen (stylus pen) 40 is required to be temporarily separated from the operation surface of the tablet on tapping entry that alternates electrical connection and disconnection with the operating surface, which also lowers its operability.

SUMMARY OF THE INVENTION

The present invention has been made to solve such problems, and an object of the present invention is to provide an input pen which is able to arbitrarily set an angle between the axis and an operating section thereof and which always offers high operability.

Another object of the present invention is to provide an input pen which is able to perform tapping entry while keeping an operating section thereof in contact with an operation surface of a capacitance-detecting coordinate input device and which always offer high operability.

In order to achieve the above objects, according to one aspect of the present invention, there is provided an input pen used to operate an operation surface of a capacitance-detecting coordinate input device, comprising a rod-like body, a conductive section joined to one end of the body, a conductive ball joint located at the tip of the conductive section to turn relative to the conductive section, and a conductive operating section integrally joined to the conductive ball joint and projecting from the tip of the conductive section.

The conductive ball joint integrally, which projects from the tip of the conductive section and is to make contact with the operation surface of the capacitance-detecting coordinate input device, is able to be appropriately turned relative to the conductive section by inclining the body of the input pen at a desired angle while keeping the conductive operating section in contact with the operation surface. Accordingly, it is possible to incline the input pen at an arbitrary angle with respect to the axial direction, that is, at the angle that the operator using the input pen desires, and to thereby obtain an input pen which offers high operability for any operator.

According to another aspect of the present invention, there is provided an input pen used to operate an operation surface of a capacitance-detecting coordinate input device, comprising a rod-like body, a conductive section coupled to one end of the body, a conductive ball joint located at the tip of the conductive section to turn relative to the conductive section and slide in the axial direction of the conductive section, a conductive operating section integrally joined to the conductive ball joint and projecting from the tip of the conductive section, and a slide switch located at the inner tip of the conductive section, the slide switch electrically connecting or disconnecting the conductive section and the conductive ball joint when the body is pressed toward one end thereof while keeping the conductive operating section in contact with the operation surface.

The slide switch may operate to electrically connect the conductive section and the conductive ball joint when the body is not pressed, and to electrically disconnect the conductive section and the conductive ball joint when the body is pressed toward one end thereof.

Furthermore, the slide switch may operate to electrically connect the conductive section and the conductive ball joint when the body is not pressed, to electrically disconnect the conductive section and the conductive ball joint when the body starts to be pressed, and to electrically connect again the conductive section and the conductive ball joint when the body is further pressed.

Still furthermore, the slide switch may comprise the conductive ball joint, a sliding path for allowing the conductive ball joint to slide in the axial direction of the conductive section therein, an elastic member located inside the sliding path to elastically press the conductive ball joint toward the tip of the conductive section, and conductive and insulating regions arranged inside the sliding path along the axial direction to make contact with the conductive ball joint.

The conductive ball joint, which projects from the tip of the conductive section and is to make contact with the operation surface of the capacitance-detecting coordinate input device, is able to be appropriately turned relative to the conductive section by inclining the body of the input pen at a desired angle while keeping the conductive operating section in contact with the operation surface. Accordingly, it is possible to use the input pen at an arbitrary angle with respect to the axial direction, that is, at the angle that the operator using the input pen desires. In addition, the slide switch is actuated by appropriately pressing the body toward the operation surface while keeping the conductive operating section in contact with the operation surface, and produces a state similar to a state in which the conductive operating section is separate from the operation surface. In other words, it is possible to perform tapping entry, and to obtain an input pen that offers high operability for any operator.

DESCRIPTION OF THE PREFERRED EMBODIMENTS

The preferred embodiments of the present invention will be described below with reference to the attached drawings.

Figure 1:
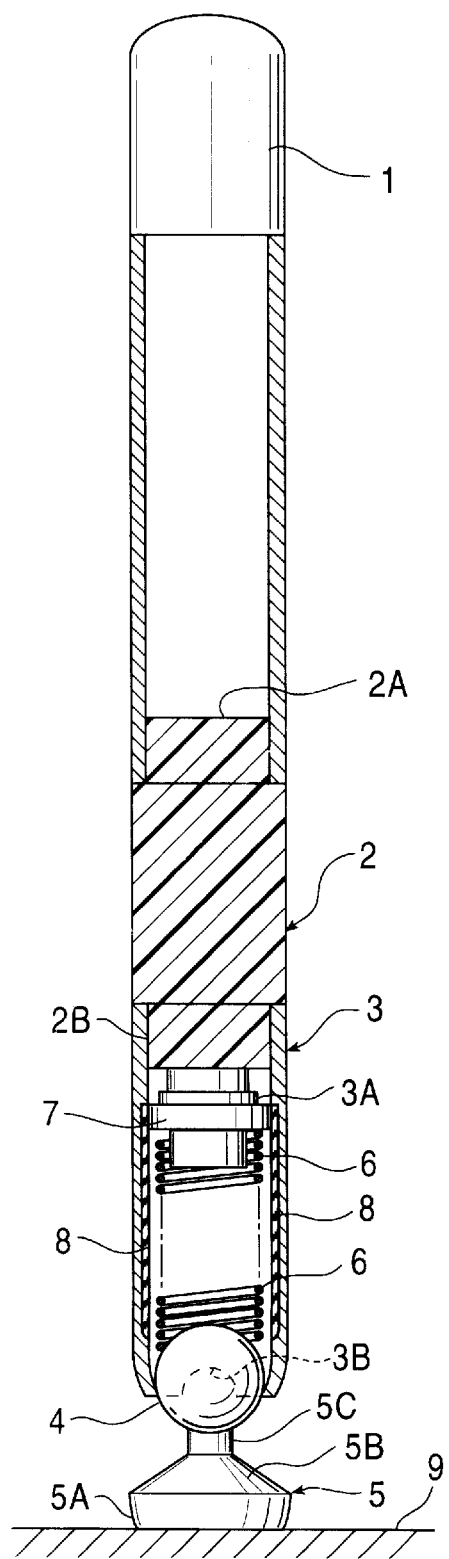
FIG. 1 is a partly-sectioned outward view of an input pen according to a first embodiment of the present invention.

FIG. 1 is a partly-sectioned outward view of an input pen according to a first embodiment of the present invention.

As shown in FIG. 1, the input pen of the first embodiment comprises a hollow metal body 1 shaped like a cylindrical rod, a cylindrical insulating member 2 having the same diameter as the hollow metal body 1, a cylindrical hollow conductive metal section 3 having the same diameter as the hollow metal body 1, a conductive ball joint 4, a conductive operating section 5, a compression spring member 6, a spring bearing member 7, and an insulating region 8. FIG. 1 also shows an operation surface 9 of a tablet which serves as a capacitance-detecting coordinate input device.

The hollow metal body 1 shaped like a cylindrical rod is open at one end, and is sealed in the shape of a dome at the other end. The cylindrical insulating member 2 is provided at both ends with projecting sections 2A and 2B of a smaller diameter. One projecting section 2A is fitted in an opening formed at one end of the hollow metal body 1, and the other projecting section 2B is fitted in an opening formed at the base end of the hollow conductive metal section 3. The hollow metal body 1, the cylindrical insulating member 2 and the hollow conductive metal section 3 constitute a single rod. The conductive ball joint 4, the spring member 6 and the spring bearing member 7 are inserted inside a hollow section 3A of the hollow conductive metal section 3, and the hollow section 3A slightly decreases in inner diameter at the tip thereof so that the conductive ball joint 4 does not come out of the hollow section 3A and is able to appropriately turn at the tip position. The compression spring member 6 is interposed between the spring bearing member 7, positioned by the other projecting section 2B of the cylindrical insulating member 2, and the conductive ball joint 4, so as to always elastically press the conductive ball joint 4 toward the tip of the hollow section 3A. The hollow section 3A is provided with the insulating region 8 on the inner surface except a part thereof at the tip side, and semicircular cutouts 3B on the opposite sides of an opening formed at the tip thereof. Moreover, the conductive operating section 5 is composed of a disk section 5A to make contact with the operation surface 9 of the tablet, and having a little larger diameter than the conductive ball joint 4, a conical section 5B integrally joined to the disk section 5A, and a small-diameter cylindrical section 5C integrally joined to the conical section 5B and the conductive ball joint 4. In this case, the hollow section 3A, the conductive ball joint 4, the spring member 6, the spring bearing member 7, and the insulating region 8 constitute a slide switch.

The input pen of the first embodiment having the above structure is operated in the following manner.

Figure 4:
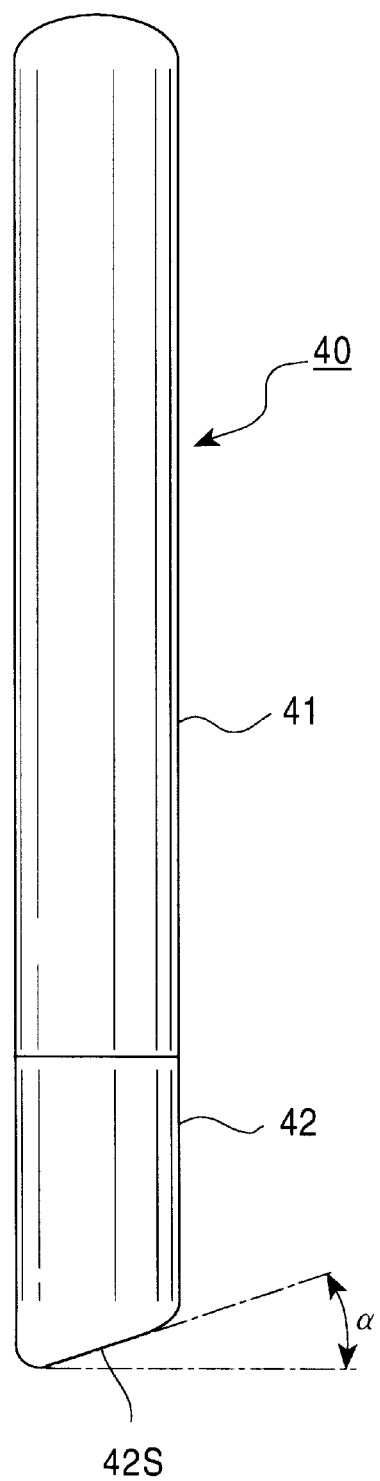
FIG. 4 is an outward view of a well-known input pen (stylus pen).

When the operation surface 9 of the tablet is operated with this input pen, the operator grips the hollow metal body 1 and/or the cylindrical insulating section 2 as if to hold a pencil or a writing pen in the same manner as the well-known input pen 40 (see FIG. 4), and brings the disk section 5A of the conductive operating section 5 into contact with the operation surface 9 while keeping at least one finger in contact with the hollow conductive metal section 3. At this time, an angle $\alpha$, that the disk section 5A of the conductive operating section 5 forms with the axial direction of the gripped input pen, is adjusted by turning the conductive ball joint 4 joined to the conductive operating section 5. When the contacting disk section 5A is moved on the operation surface 9 along a required path, charges accumulated in a portion of the operation surface 9 in contact with the disk section 5A are sent from the conductive operating section 5 to the conductive ball joint 4, then, from the hollow conductive metal section 3 in electric contact with the conductive ball joint 4 to the finger of the operator, whereby it is possible to input a coordinate position corresponding to the moving state of the disk section 5A.

Figure 2A:
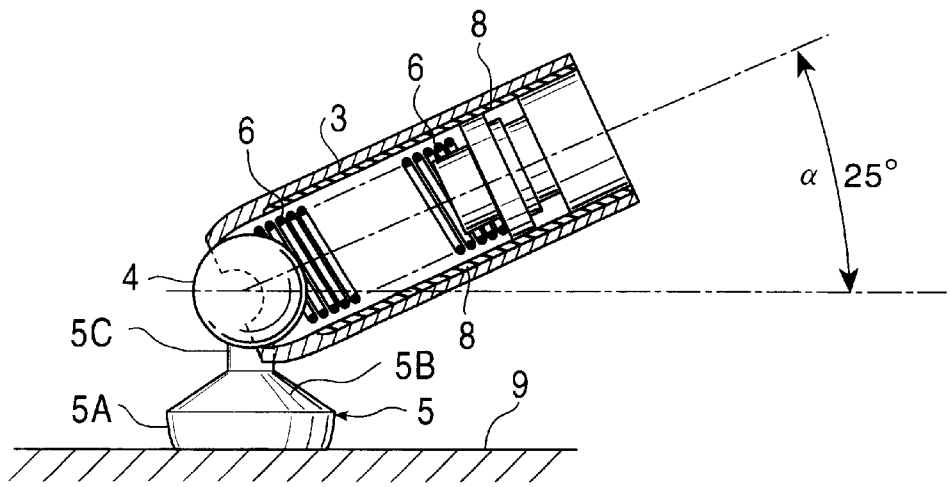
FIGS. 2A and 2B are views showing states in which a main body of the input pen shown in FIG. 1 is inclined.
Figure 2B:
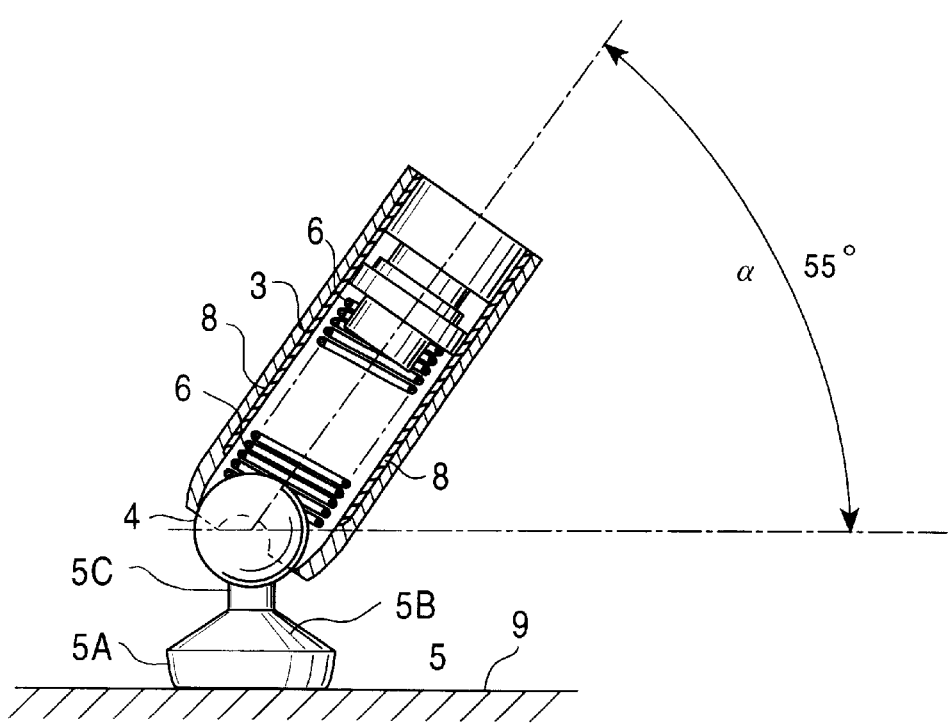

FIGS. 2A and 2B each show the principal part of the input pen in a state where the axis of the input pen is inclined at the maximum angle toward the disk section 5A of the conductive operating section 5, that is, the angle $\alpha$ is shifted to the smallest possible angle. FIG. 2A shows a state in which the smallest possible angle $\alpha$ is about 25°, and FIG. 2B shows a state in which the smallest possible angle $\alpha$ is about 55°.

In FIGS. 2A and 2B, the same components as in FIG. 1 are denoted by the same numerals.

As shown in FIG. 2A, in order to incline the axial position of the input pen greatly toward the disk section 5A of the conductive operating section 5, that is, to make the angle $\alpha$ as small as possible, the input pen is inclined so that the small-diameter cylindrical section 5C integrally joined to the conductive ball joint 4 is fitted in one of the semicircular cutouts 3B formed at the tip opening of the hollow section 3A in the hollow conductive metal section 3. As a result, it is possible to incline the input pen until the small-diameter cylindrical section 5C is brought into contact with the innermost portion of the semicircular cutout 3B, for example, down to about 25°.

Similarly, in order to incline the axial position of the input pen greatly toward the disk section 5A of the conductive operating section 5, that is, to make the angle $\alpha$ as small as-possible as shown in FIG. 2B, the input pen is inclined while the small-diameter cylindrical section 5C integrally joined to the conductive ball joint 4 is out of one of the semicircular cutouts 3B formed at the tip opening of the hollow section 3A in the hollow conductive metal section 3. In this case, it is possible to incline the input pen until the small-diameter cylindrical section 5C is brought into contact with the tip opening of the hollow section 3A, for example, down to about 55°.

When the operation surface 9 of the tablet is operated with the input pen of the first embodiment, if the operator presses the input pen gripped in the hand toward the operation surface 9 in a state in which the disk section 5A of the conductive operating section 5 is in fixed contact with the operation surface 9 and the axial position of the input pen is inclined toward the operation surface 9 at as small an angle as possible, that is, the angle α is near 90°, the conductive ball joint 4 integrally joined to the conductive section 5 slides inward from the tip of the hollow section 3A against the elastic force of the compression spring member 6 in the slide switch. At this time, the conductive ball joint 4 in contact with the conductive region (the hollow conductive metal section 3) at the tip of the hollow section is brought into contact with the insulating region 8 located inside the hollow section 3A, and the conductive operating section 5 of the input pen and the finger of the operator are electrically insulated from each other, which is equivalent to a state in which the conductive operating section 5 is separated from the operation surface 9. Tapping entry through the input pen is thereby allowed to be performed.

Although the tip of the hollow section 3A in the hollow conductive metal section 3 is formed of a conductive region, that is, a part of the hollow conductive metal section 3 in the first embodiment, a narrow insulating region may be provided at the inner tip of the hollow section 3A. In this case, when the operator brings the conductive operating section 5 into mere contact with the operation surface 9, the conductive ball joint 4 makes contact with the narrow insulating region, and the conductive operating section 5 is electrically insulated from the finger of the operator. When the operator slightly presses the input pen toward the operation surface 9 to move the conductive operating section 5 on the operation surface 9, the conductive ball joint 4 makes contact with the conductive region (the hollow conductive metal section 3) connected to the narrow insulating region, so that the conductive operating section 5 and the finger of the operator are electrically connected to each other.

Figure 3:
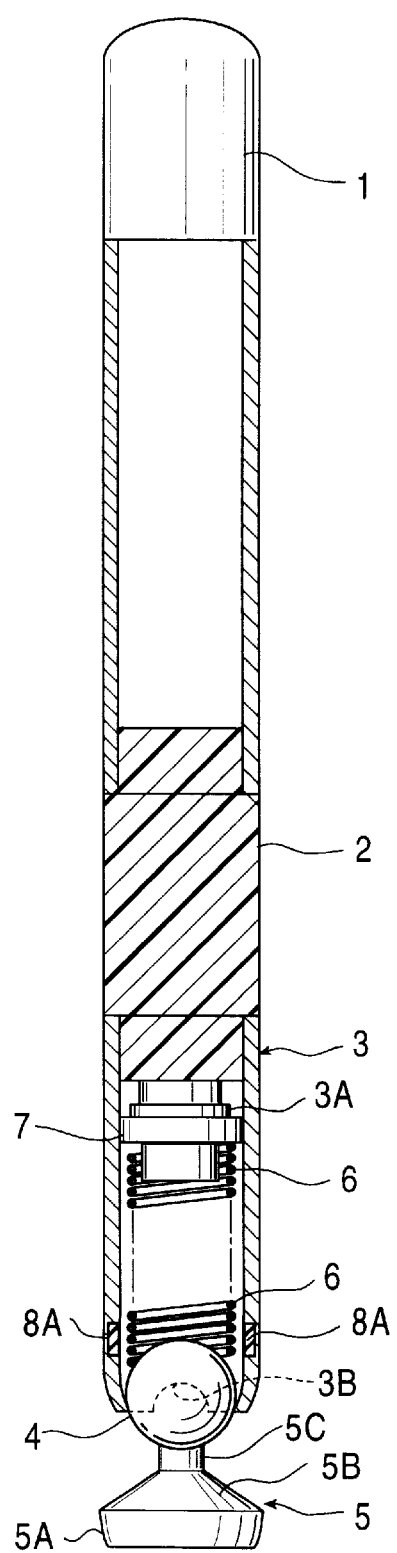
FIG. 3 is a partly-sectioned output view of an input pen according to a second embodiment of the present invention.

FIG. 3 is a partly-sectioned outward view of an input pen according to a second embodiment of the present invention.

As shown in FIG. 3, the input pen of the second embodiment comprises, similarly to the input pen of the first embodiment, a hollow metal body 1 shaped like a cylindrical rod, a cylindrical insulating member 2 having the same diameter as the hollow metal body 1, a cylindrical hollow conductive metal section 3 having the same diameter as the hollow metal body 1, a conductive ball joint 4, a conductive operating section 5, a compression spring member 6, and a spring bearing member 7. The input pen further comprises a narrow insulating region 8A. FIG. 3 also shows an operation surface 9 of a tablet.

In this case, the first embodiment and the second embodiment are structurally different only in the part of the slide switch, more specifically, the insulating regions 8 and 8A placed in a hollow section 3A of the hollow conductive metal section 3 are different in width. In the first embodiment, the wide insulating region 8 is formed over almost the entire hollow section 3A except the tip thereof. On the other hand, in the second embodiment, the narrow insulating region 8A is formed over only a part of the hollow section 3A relatively near the tip thereof and the residual part is formed of a conductive region (the hollow conductive metal section 3). There are no other structural differences between the first embodiment and the second embodiment. Therefore, a further description of the second embodiment is omitted.

As will be described below in detail, the first embodiment and the second embodiment are slightly different in the operation of the slide switch on tapping entry. However, there are no other operational differences therebetween. Therefore, only the operation of the slide switch in the second embodiment will be described, and a description of other operations is omitted.

The operation of the slide switch in the second embodiment is the same as that of the first embodiment in that the slide switch is actuated by pressing the input pen toward the operation surface 9 and sliding the conductive ball joint 4 integrally joined to the conductive operating section 5 inward from the inner tip of the hollow section 3A against the elastic force of the compression spring member 6. However, in the second embodiment, when the input pen is pressed, the conductive ball joint 4 in contact with the conductive region (the hollow conductive metal section 3) at the tip of the hollow section 3A is first brought into contact with the narrow insulating region 8A located in the hollow section 3A, and the conductive operating section 5 and the finger of the operator are electrically insulated from each other, which is equivalent to a state where the conductive operating section 5 is separated from the operation surface 9. When the input pen is further pressed, the conductive ball joint 4 in contact with the narrow insulating region 8A placed in the hollow section 3A is brought into contact with the conductive region (the hollow conductive metal section 3) connected thereto, which produces again a condition where the conductive operating section 5 and the finger of the operator are electrically connected, that is, a condition where the conductive operating section 5 is brought again in contact with the operation surface 9. In the second embodiment, tapping entry is performed by operating the slide switch in the same manner as in the first embodiment.

Although the tip of the hollow section 3A in the hollow conductive metal section 3A is also formed of a conductive region, that is, a part of the hollow conductive metal section 3 in the second embodiment, there may be provided another narrow insulating region at the inner tip of the hollow section 3A. In this case, when the operator brings the conductive operating section 5 in mere contact with the operation surface 9, the conductive ball joint 4 makes contact with the other insulating region, and the conductive operating section 5 is electrically insulated from the finger of the operator. When the operator slightly presses the input pen toward the operation surface 9 to move the conductive operating section 5 on the operation surface 9, the conductive ball joint 4 shifts from the other narrow insulating region to the conductive region (the hollow conductive metal section 3) connected thereto, and the conductive operating section 5 and the finger of the operator are thereby electrically connected.

In this way, according to the embodiments of the present invention, the conductive ball joint 4 is integrally joined to the conductive operating section 5, which projects from the tip of the hollow conductive metal section 3 to make contact with the operation surface 9, and is mounted turnably relative to the hollow conductive metal section 3. The conductive ball joint 4 is appropriately turned inside the hollow conductive metal section 3, and the hollow metal body 1 shaped like a cylindrical rod is inclined at an arbitrary angle with respect to the axis thereof. Therefore, it is possible to use the input pen at an angle position that the operator desires. In addition, by appropriately pressing the hollow metal body 1 toward the operation surface 9 while keeping the conductive operating section 5 in contact with the operation surface 9, the slide switch is actuated. The action of the slide switch achieves the same state as a state in which the conductive operating section 5 is separated from the operation surface 9, that is, allows tapping entry. As a result, it is possible to obtain an input pen which offers high operability for any operator.

Although the slider switch is formed inside the hollow conductive metal section 3 in the above-mentioned embodiments, the input pen may have no slide switch inside the hollow conductive metal section 3 in another embodiment. More specifically, the conductive ball joint 4 may be able to only turn at the tip of the hollow section 3A of the hollow conductive metal section 3 without sliding inside the hollow section 3A.

In this case, however, it is required on tapping entry to temporarily separate the conductive operating section 5 from the operation surface 9, or to separate the finger of the operator from the hollow conductive metal section 3.

As mentioned above, according to the present invention, the conductive ball joint integrally joined to the conductive operating section, which projects from the tip of the conductive section and is to make contact with the operation surface of the capacitance-detecting coordinate input device, is able to be appropriately turned relative to the conductive section by inclining the body of the input pen at a desired angle while keeping the conductive operating section in contact with the operation surface. Accordingly, it is possible to use the input pen at an arbitrary angle with respect to the axial direction, that is, at the angle that the operator using the input pen desires. In addition, the slide switch is actuated by appropriately pressing the body toward the operation surface while keeping the conductive operating section in contact with the operation surface, and produces a state similar to a state in which the conductive operating section is separate from the operation surface. In other words, it is possible to perform tapping entry, and to obtain an input pen that offers high operability for any operator.

What is claimed is:

1. An input pen for use in operating an operation surface of a capacitance-detecting coordinate input device, comprising:
   a rod-like body;
   a conductive section connected to one end of said body;
   a conductive ball joint mounted at the tip of said conductive section to turn relative to said conductive section; and
   a conductive operating section joined to said conductive ball joint and projecting from the tip of said conductive section.

2. An input pen for use in operating an operation surface of a capacitance-detecting coordinate input device, comprising:
   a rod-like body;
   a conductive section connected to one end of said body;
   a conductive ball joint mounted at the tip of said conductive section to turn relative to said conductive section;
   a conductive operating section joined to said conductive ball joint and projecting from the tip of said conductive section; and
   a slide switch mounted at the inner tip of said conductive section,
   wherein said slide switch electrically connects or disconnects said conductive section and said conductive ball joint when said body is pressed toward one end thereof with said conductive operating section in contact with said operating surface.

3. An input pen according to claim 2, wherein said slide switch electrically connects said conductive section and said conductive ball joint when said body is not pressed, and electrically disconnects said conductive section and said conductive ball joint when said body is pressed toward one end thereof.

4. An input pen according to claim 2, wherein said slide switch electrically connects said conductive section and said conductive ball joint when said body is not pressed, electrically disconnects said conductive section and said conductive ball joint when said body starts to be pressed toward one end thereof, and electrically connects again said conductive section and said conductive ball joint when said body is further pressed toward one end thereof.

5. An input pen according to claim 2, wherein said slide switch comprises said conductive ball joint, a slide path for allowing said conductive ball joint to slide in the axial direction of said conductive section therein, an elastic member located in said slide path to elastically press said conductive ball joint toward the tip of said conductive section, and conductive and insulating regions arranged along said axial direction in said slide path to make contact with said conductive ball joint.

6. An input pen according to claim 3, wherein said slide switch comprises said conductive ball joint, a slide path for allowing said conductive ball joint to slide in the axial direction of said conductive section therein, an elastic member located in said slide path to elastically press said conductive ball joint toward the tip of said conductive section, and conductive and insulating regions arranged along said axial direction in said slide path to make contact with said conductive ball joint.

7. An input pen according to claim 4, wherein said slide switch comprises said conductive ball joint, a slide path for allowing said conductive ball joint to slide in the axial direction of said conductive section therein, an elastic member located in said slide path to elastically press said conductive ball joint toward the tip of said conductive section, and conductive and insulating regions arranged along said axial direction in said slide path to make contact with said conductive ball joint.

\* \* \* \* \*